March 6, 1928.

H. A. FOLLINGSTAD

KEY PULLING DEVICE

Filed April 6, 1927

1,661,938

Henry A. Follingstad
INVENTOR

BY Victor J. Evans
ATTORNEY

WITNESS:

Patented Mar. 6, 1928.

1,661,938

UNITED STATES PATENT OFFICE.

HENRY A. FOLLINGSTAD, OF CHICAGO, ILLINOIS.

KEY-PULLING DEVICE.

Application filed April 6, 1927. Serial No. 181,521.

The object of this invention is to provide for withdrawing a key from a pulley wheel, or other similar element, secured to a shaft or the like, the device including a pair of plates and a plurality of threaded devices cooperating with the plates, the elements being so assembled that a thrust is imparted or produced against the end of the shaft to which the pulley wheel is attached, and pulling action is exerted on the key by one of the plates formed to engage the head of the key.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:

Figure 1:
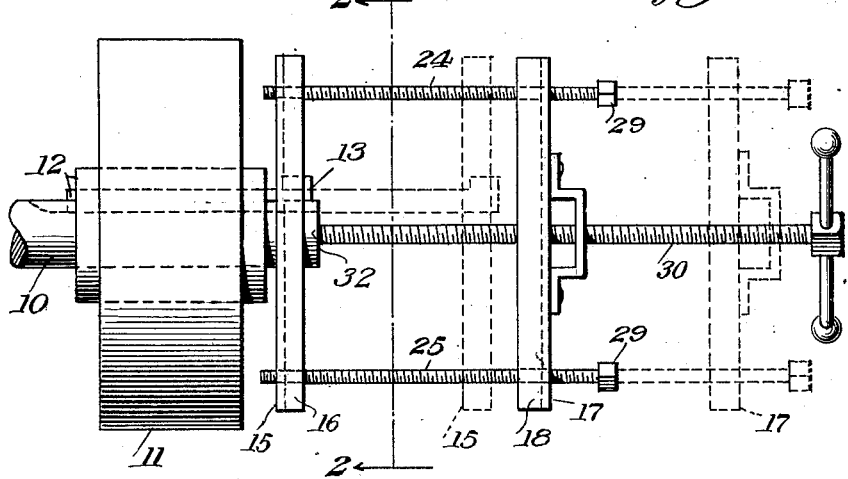
Fig. 1 is a view showing the device in elevation, and in operative position, the full lines indicating the manner of applying the device, and the dotted lines showing the manner of accomplishing the result.

In Fig. 1 a shaft 10 carries a pulley wheel 11, which it is assumed has been secured by a key 12 having a head 13. Any element applied by the use of a key of this type, may be withdrawn in the manner to be disclosed herein.

Figure 3:
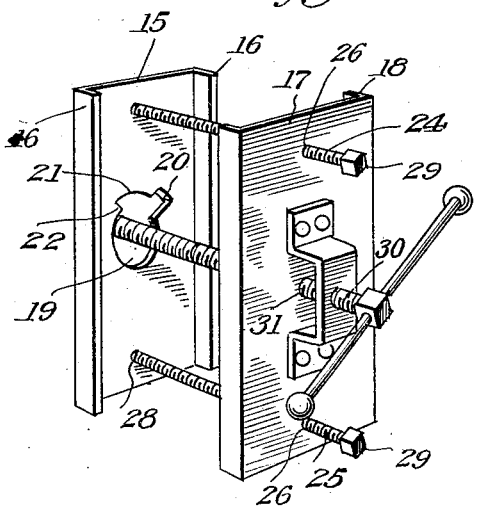
Fig. 3 is a perspective view, showing the two plates employed, and the three screws used in connection therewith.

The complete structure of the pulling or extracting device, is shown in Fig. 3, and includes the inner plate 15 having flanges 16 on the long edges thereof, and further includes a plate 17 having flanges 18 facing those first named,—that is the flanges of the plates are turned toward each other.

Figure 2:
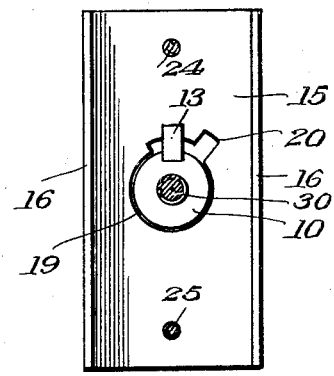
Fig. 2 is a detail in elevation, showing the plate adjacent to the pulley, and showing the head of a key engaged by a particular form of slot, or engaged by the edge portion of the slot, after the plate is first applied directly over the head, and then partly rotated.

Plate 15 is provided with an approximately central opening 19, and adjacent to the opening is a recess or cutaway portion 20, so formed that the head of the key may pass thru this portion 20. Communicating with the cutaway portion just referred to is a curved cutaway portion 21 terminating at shoulder 22, and owing to the arrangement shown in Figs. 2 and 3, partial rotation of plate 15, after being applied to the head of the key, causes engagement of the head in the manner illustrated in Fig. 2.

The outer plate 17 receives screws 24 and 25, these screws being threaded for their full length, and engaging threaded openings at 26 in the plate 17. Screws 24 and 25 are also threaded thru plate 15, as shown at 28, and these screws may be provided with angular heads 29.

The central screw 30 is threaded thru opening 31 in plate 17, and this screw also carries an angular head, and is threaded for its full length. The inner end of screw 30 is designed to engage the end of shaft 10, as shown at 32, and the various elements being properly positioned, in an obvious manner, it will be observed that upon screwing up element 30, the key 12 will be withdrawn, permitting of the release of pulley wheel or other similar element 11.

Having described the invention what is claimed is:—

In a device of the class described, a plate provided with an opening and with a slot extending outwardly from the opening, a second plate, screws threaded into the plates, said plates being in spaced relation, and an additional screw mounted between those first named and threaded into the plate opposite that provided with the opening and slot.

In testimony whereof I affix my signature.

HENRY A. FOLLINGSTAD.